(12) United States Patent
Tilly

(10) Patent No.: US 7,159,702 B2
(45) Date of Patent: Jan. 9, 2007

(54) ACTUATOR FOR VISCOUS CLUTCH WITH MAGNETIC OIL CIRCULATION VALVE

(75) Inventor: Christian Tilly, Uhldingen-Mühlhofen (DE)

(73) Assignee: BorgWarner Inc., Auburn Hills, MI (US)

( * ) Notice: Subject to any disclaimer, the term of this patent is extended or adjusted under 35 U.S.C. 154(b) by 30 days.

(21) Appl. No.: 10/884,282

(22) Filed: Jul. 2, 2004

(65) Prior Publication Data
US 2005/0045443 A1 Mar. 3, 2005

(30) Foreign Application Priority Data
Jul. 4, 2003 (EP) ................... 03015180

(51) Int. Cl.
F16D 35/02 (2006.01)
F16K 31/02 (2006.01)

(52) U.S. Cl. .................. 192/58.61; 251/129.2
(58) Field of Classification Search .............. 192/58.61
See application file for complete search history.

(56) References Cited

U.S. PATENT DOCUMENTS

| | | | | |
|---|---|---|---|---|
| 4,270,641 A | * | 6/1981 | Nonnenmann et al. | 192/58.61 |
| 4,305,491 A | * | 12/1981 | Rohrer | 192/58.61 |
| 4,633,994 A | * | 1/1987 | Light | 192/58.61 |
| 5,816,376 A | * | 10/1998 | Hatori | 192/58.61 |
| 5,893,442 A | * | 4/1999 | Light | 192/58.61 |
| 5,992,594 A | * | 11/1999 | Herrle et al. | 192/58.61 |
| 6,026,943 A | * | 2/2000 | Fuchs et al. | 192/58.61 |
| 6,032,775 A | * | 3/2000 | Martin | 192/58.61 |
| 2002/0008601 A1 | * | 1/2002 | Yajima et al. | 335/220 |

FOREIGN PATENT DOCUMENTS

EP  1 120 578 A2 * 8/2001
EP  1248007      10/2002

* cited by examiner

Primary Examiner—Rodney H. Bonck
(74) Attorney, Agent, or Firm—Greg Dziegielewski; Artz & Artz, P.C.

(57) ABSTRACT

An actuator which, by a movement of a component which is generated by means of an electric current, can effect control of another component in a mechanical environment having rotating parts which are housed in a very small space. A rotating element, for example a clutch shaft (1; 21), is hollow, and an electromagnetic coil arrangement (7; 24) is housed in this cavity in such a way that the excitation of the coil is converted into a mechanical displacement of a component arranged outside the clutch shaft, for example of a sleeve sliding axially on the clutch shaft. For this purpose, parts of the clutch shaft are made ferromagnetic and are integrated in the magnetic loop of the coil (7; 24). The actuator according to the invention can be used, for example, in a viscous clutch for controlling the throughput of shear medium.

11 Claims, 2 Drawing Sheets

ACTUATOR FOR VISCOUS CLUTCH WITH MAGNETIC OIL CIRCULATION VALVE

TECHNICAL FIELD

The present invention relates to actuators for viscous clutches and more particularly to viscous clutches with actuators with oil circulation valves.

BACKGROUND OF THE INVENTION

In viscous clutches, the torque of a rotation source is transmitted via discs enclosing a shear region, a small distance apart and substantially parallel to one another, from the rotation source to an element to be driven. The amount of shear fluid which is introduced between the rotating discs into the shear region controls the degree of torque transmission between a lower threshold value, for example 10%, to virtually completely.

The control of the amount of shear fluid, for example silicone oil, which is introduced into the shear region is effected by a valve which can be opened and closed by means of an actuator. European Patent Application 1 248 007 describes such an actuator, which is arranged outside the clutch shaft and around the latter. Since the actuator is stationary and the clutch shaft rotates, it is necessary to use a correspondingly dimensioned ball bearing whose internal diameter according to the EP Patent Application corresponds to the external diameter of the shaft. For each shaft size, it is therefore necessary to use and especially to stock an appropriate ball bearing. Furthermore, the solution according to the EP Patent Application requires the use of insulating material.

It is an object of the present invention to provide an improved viscous clutch. It is also an object of the present invention to provide a viscous clutch which is smaller in size and is less complex than known viscous clutches.

It is an additional object of the present invention to provide a viscous clutch with an actuator which minimizes or eliminates the use of insulating material.

It is a still further object of the present invention to provide an actuator for the shear fluid circulation, for example of a viscous clutch, in which the size of the actuator components are substantially reduced which in turn reduces the size of the entire viscous clutch.

SUMMARY OF THE INVENTION

These and other objects are achieved by the present invention as described, depicted, and claimed herein. In general, the present invention relates to an actuator for actuating, for example, a valve for controlling the oil throughput of a viscous clutch. The actuator cooperates functionally with a rotating part of the viscous clutch, such as, for example, the clutch shaft. The actuator also has a primary actuator which is mounted by means of a bearing permitting a rotation of the actuator relative to the clutch shaft or the like on the clutch shaft or the like. The clutch shaft or the like preferably has a hollow cylindrical region, and the primary actuator is arranged inside the hollow cylindrical region. The actuator and clutch shaft or the like have means for communicating the control activity of the primary actuator from inside the hollow cylindrical region to the outside.

The arrangement of the primary actuator inside the clutch shaft makes it possible to design the actuator substantially smaller than if it were arranged around the clutch shaft. It is also possible to use a standard actuator side since the internal bore of the clutch shaft can be kept constant, depending on its external diameter. The ball bearings or roller bearings for relative positioning between coil axle and clutch shaft can be made much smaller than the ball bearing of the EP Patent Application, in which a ball bearing is arranged outside the clutch shaft.

According to an embodiment of the invention, the primary actuator comprises a solenoid coil. By means of this solenoid coil, it is possible to produce a magnetic field with the aid of which a mechanical component can be brought into different positions. These different positions can be transmitted to a valve, which is controllable thereby between open and closed.

With the use of the actuator according to the invention in a viscous clutch, the valve controlled by the actuator can be used for controlling the flow rate of shear fluid, such as silicone oil.

According to an embodiment of the invention, the moveable component may be a sleeve. The sleeve is mounted on the clutch shaft, closely but to permit sliding, outside the clutch shaft. The sleeve can be moved by the primary actuator between two end positions defined by corresponding stops.

For this purpose, it is advantageous if regions of the clutch shaft and the moveable sleeve are part of the magnetic loop of a solenoid coil.

According to an embodiment of the invention, the solenoid coil may be mounted on a stationary coil axle. The outer contour of the coil axle carries the inner contour of a ball bearing which rests with its own outer contour on the inner surface of the hollow cylindrical clutch shaft. This allows relative rotation between the coil axle and clutch shaft.

In one embodiment, the wall of the hollow cylindrical region of the clutch shaft consists of a hollow cylindrical main shaft of ferromagnetic material, a pot like shaft front part of ferromagnetic material and nonmagnetic intermediate part which is arranged axially between main part and shaft front part. This results in a hollow cylinder of ferromagnetic material with a nonmagnetic sector more or less in the middle of its axial length, said sleeve being arranged outside this hollow cylinder in such a way that it extends over the nonmagnetic part, and, in one end position, it has a considerable overlap with one of the two ferromagnetic parts and little or no overlap with the other of the two ferromagnetic parts whereas, in the other end position, it has substantially equal overlaps with both ferromagnetic parts of the clutch shaft.

Main shaft, intermediate part and shaft front part can be screwed, welded, or otherwise fixedly secured to one another.

According to another embodiment of the invention, the actuator can be designed such that the moveable component is formed from a pot-like shaft front part enclosing, with its sleeve-like region, the cylindrical part of the clutch shaft.

The pot-like front part of the clutch shaft may be moved in a telescopic-type manner on the clutch shaft, and this displacement can be utilized as a control movement, for example of the oil flow valve of a viscous clutch.

In the embodiments of the invention which have been described, the moveable components or the sleeves can also be pretensioned by means of a resilient member, such as a spring in one of their two end positions.

BRIEF DESCRIPTION OF THE DRAWINGS

The invention will now be explained in more detail with reference to the drawings, in which.

DESCRIPTION OF PREFERRED EMBODIMENTS

Figure 1:
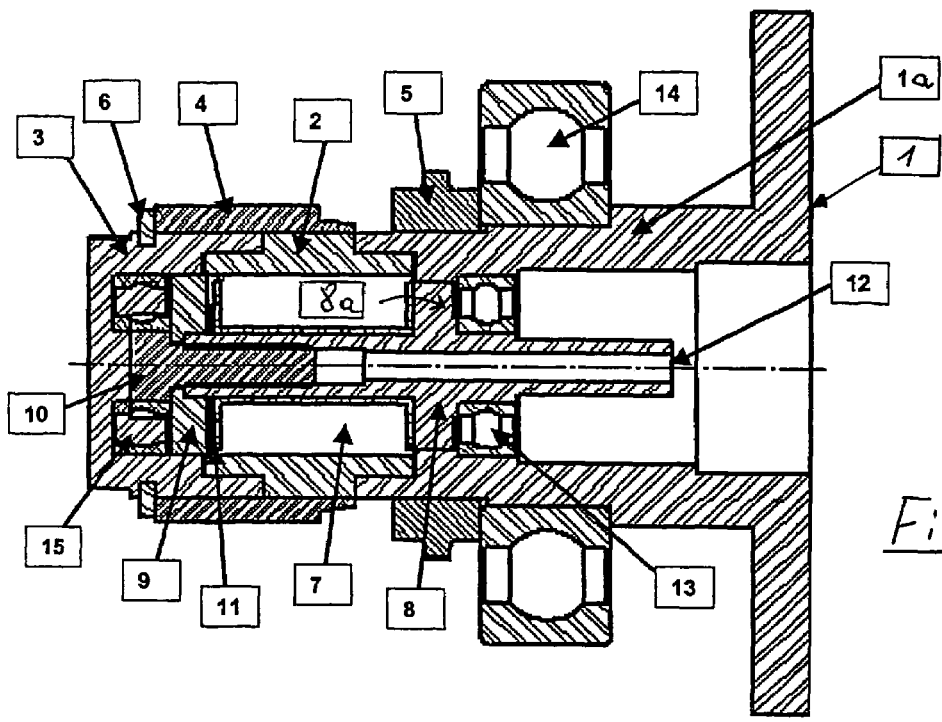
FIG. 1 shows a first embodiment of the present invention.

FIG. 1 shows a lower unit of a viscous clutch. The input shaft I of the viscous clutch is mounted by means of a ball bearing or roller bearing 14 in a clutch housing, which is not shown, and can rotate freely in the clutch housing (if it is caused to rotate by a clutch disc rotationally connected to it and not shown).

Figure 3:
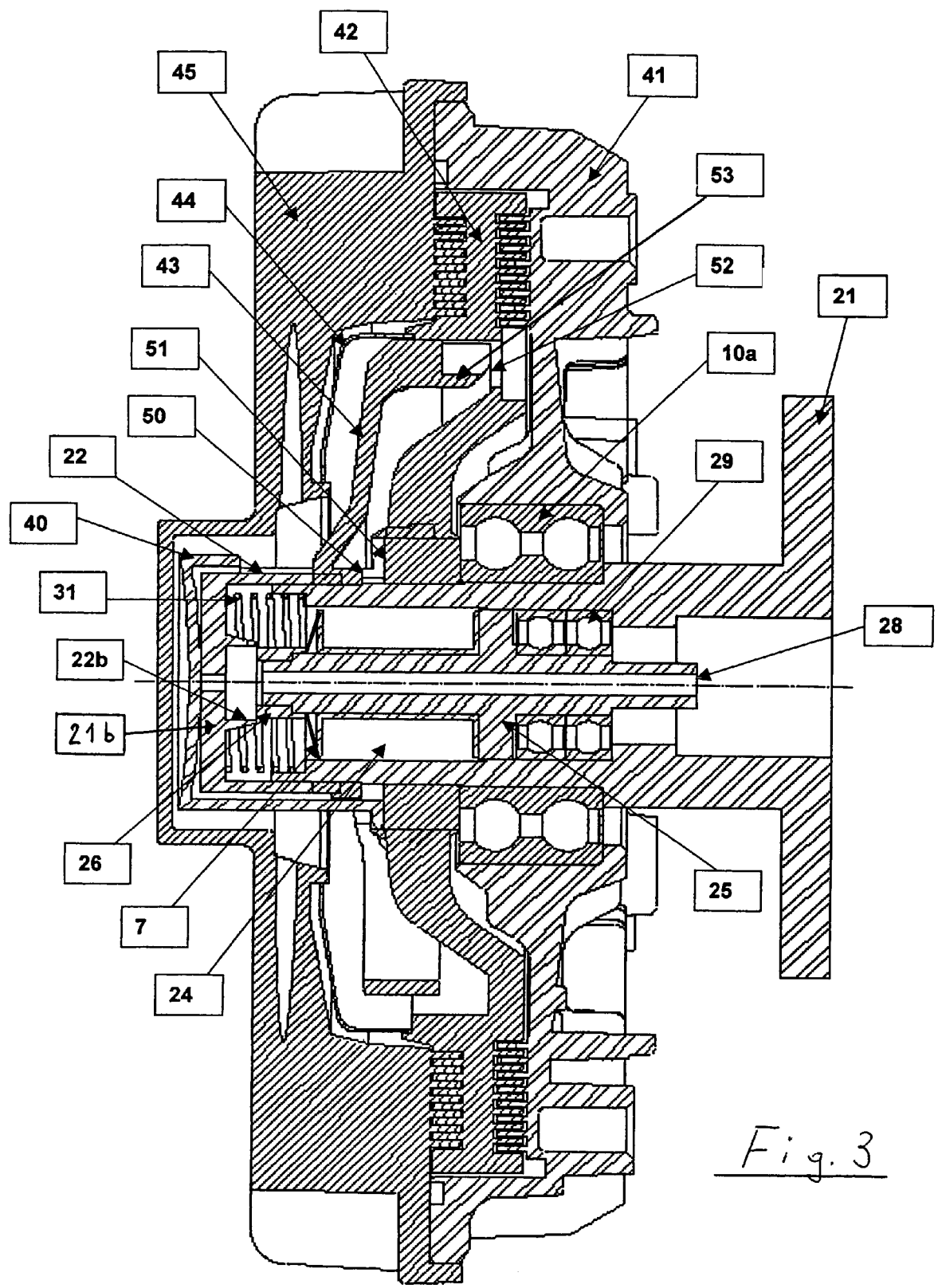
FIG. 3 shows a viscous clutch having an actuator according to an embodiment of the present invention.

As shown in FIG. 3, the input shaft of the clutch is nonrotatably connected to a primary disc 42 which has, in its radially outer region, a labyrinth formation which, together with an opposite similar formation, forms the so-called shear zone of the viscous clutch. Shear fluid is introduced into the shear zone in order to transmit the rotation from the driven primary disc to the clutch disc (in FIG. 3, this is the clutch cover), the amount of shear fluid being decisive for the ratio of the speed of the driven primary disc to the driven clutch disc carried along. This ratio may vary between a preselectable minimum value, e.g. 10%, to virtually 100%, the variation being controllable by means of the amount of the oil introduced between the clutch disc and the primary disc.

The clutch shaft 1 of FIG. 1 has a main shaft 1a, an intermediate part 2 and a front part 3. Main shaft 1 and front part 3 are produced from a ferromagnetic material, whereas the intermediate part 2 is nonmagnetic. The reason for this will be explained further below.

Arranged outside the clutch shaft is a sleeve 4, which is axially displaceable on the clutch shaft between a stop 6 and a ferromagnetic ring 5. The stop can be of any conventional type, such as a snap ring.

Arranged inside the hollow cylindrical clutch shaft is a coil axle 8 which has, approximately in its axial middle, a radially enlarged region 8a whose external diameter is slightly smaller than the internal diameter of the hollow cylindrical clutch shaft. In this manner, the coil axle, which is kept in its position and prevented from rotating by means not shown, permits a rotation of the clutch shaft. To enable this rotation to take place virtually without friction, a ball bearing 13 or the like whose inner contour rests on the outer surface of the coil axle 8 and whose outer contour rests on the inner surface of the hollow cylindrical clutch shaft is provided adjacent to the radially enlarged region 8a.

A coil 7 which surrounds the coil axle is arranged on that side of the radially enlarged region 8a of the coil axle 8 which is opposite the ball bearing 13.

The coil axle is slightly longer than the coil on the side of the coil and carries a likewise stationary magnetic flux ring 9, so that the coil 7 is completely enclosed in section, in particular starting from radially inside and extending in a clockwise direction, by the coil axle 8, the radially extended region 8a of the coil axle 8, the intermediate part 2 of the clutch shaft 1 and the flux ring 9. All these parts, with the exception of the intermediate part 2, are ferromagnetic, and only the intermediate part 2 is nonmagnetic.

Excitation of the coil 7 generates a magnetic field which, starting from the coil axle 8, penetrates on the one hand via the radially enlarged region 8a of the coil axle into the main shaft 1a and the ring 5 and, on the other hand, via the flux ring 9 into the front part 3 of the clutch shaft.

This creates an axial magnetic gap between the ring 5 and the sleeve 4, the force generated by the magnetic field attempting to move the sleeve 4 in the direction of the ring 5.

A restoring means which is not shown and, for example, is in the form of a spiral spring, pretensions the sleeve in the position shown. From this position, the sleeve can be moved against the force of the restoring device into another position adjacent the ring 5 on application of an electric current of a certain strength through the turns of the coil 7.

A bolt 10 is screwed into the hollow coil axle in such a way that it clamps the coil 7 axially between the radially enlarged region 8a of the coil axle 8 and the magnetic flux ring 9.

In order to ensure an exact tolerance, constant over the circumference of the flux ring 9, between the circumferential surface of the flux ring and the inner surface of the front part 3 of the clutch shaft, a second ball bearing 15 may be used, as shown.

In order to avoid any vibrations, a Belleville ring 11 can be inserted between the flux ring 9 and the coil 7, as shown.

The description so far of FIG. 1 shows that the clutch shaft 1 carries a sleeve 4 which can be axially displaced by applying an electric current.

This axial displacement can now be used in a manner not shown to control a valve, with the aid of which the amount of shear fluid between the above-mentioned primary disc and the coupling disc can be adjusted in order to control the degree of torque transmission between these two discs.

Figure 2:
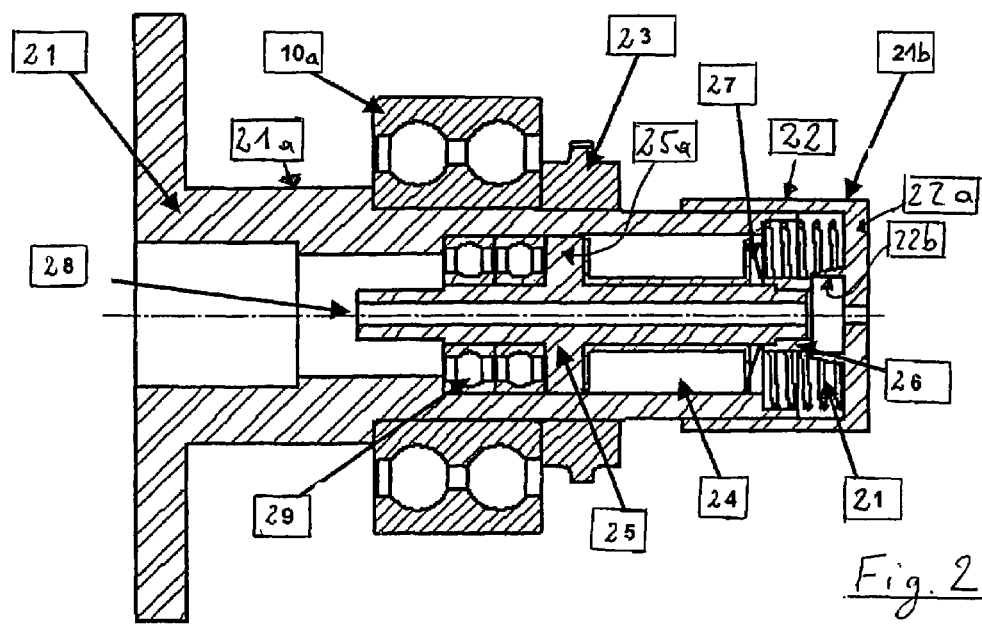
FIG. 2 shows another embodiment of the present invention.

FIG. 2 shows another embodiment of the invention, which is illustrated laterally inverted in comparison with the view in FIG. 1.

A hollow cylindrical clutch shaft 21 is mounted by means of a twin ball bearing 10a in a housing which is not shown, for example of a viscous clutch.

In contrast to FIG. 1, the clutch shaft 21 consists only of two parts, namely the main shaft 21a and the front part 21b.

Both parts of the clutch shaft are produced from ferromagnetic material, the front part 21b having a pot-like design, the cylindrical part 22 of which is mounted telescopically on the main shaft 21a and can be moved axially thereon.

Similarly to the first embodiment, the clutch shaft is hollow and holds a coil axle 25 mounted rotatably relative to the clutch shaft by a twin ball bearing 29 inside the clutch shaft.

The coil axle carries a coil 24 which is held firmly in its position by a Belleville spring 27 and which can produce a magnetic loop described further below.

The front part 21b of the clutch shaft or, on the basis of the first embodiment, the sleeve 22 is clamped by means of a spiral spring 31 in an end position which most greatly lengthens the main shaft 21, the front part 21b thereby being prevented from falling off the shaft by a stop which is not shown.

In contrast to the embodiment shown in FIG. 1, the magnetic gap is formed not axially between the sleeve 22 and the ring 23, since both elements rest on the likewise ferromagnetic shaft 21a, but between a stationary magnetic pole 26, which encloses the coil axle in an annular manner, and a central sleeve 22b which is in the form of an annular cone and is shaped from one piece together with the base part 22a of the front part 21b or is at least welded thereto, and extends axially towards the stationary magnetic pole.

The magnetic loop of the coil 24 thus extends, starting from the coil axle 25 and continuing in the clockwise direction, through a radially enlarged region 25a of the coil axle 25, the clutch shaft, the sleeve 22, the base part 22a, the central sleeve 22b in the form of an annular cone, the stationary magnetic pole 26, back to the coil axle.

The magnetic gap is formed between the stationary magnetic pole 26 and the central sleeve 22b, the thin edge of the central sleeve 22b being only a small radial distance (e.g. 0.3 mm) away from the stationary magnetic pole when the gap is opened to a maximum extent and, on application of an electric current, a force occurring which attracts the front part 21b in a direction, against the force of the spring 31, which increases the magnetic cross-section of the gap when the central sleeve is pushed telescopically onto the stationary magnetic pole, owing to the conical shape of the central sleeve.

Moreover, the base part 22a of the front part 21b is attracted by the stationary magnetic pole 26.

Here, as in the case of the movement of the sleeve 4 in the first embodiment, the movement of the sleeve 22 or of the front part 21b can be used for controlling a valve for throughput control of the shear liquid of a viscous clutch.

Common to both embodiments of the invention which have been described is that the coils 7 and 24 can be operated by means of electric cables which are led, in a manner not shown, from the coil directly into the central bore of the coil axle and follow said axle axially and emerge from the coil axle centrally at the end of the coil axle at 12 (in FIG. 1) or at 28 (in FIG. 2) and are therefore very easy to mount and to handle.

The coil axles 8 and 25 are fixed in their position by means which prevent rotation and are not shown.

FIG. 3 shows an actuator according to the invention in a viscous clutch for controlling a cooling fan of a truck.

Here, the actuator is identical to that of FIG. 2, and the reference numerals 21 to 31 are identical to those of FIG. 2.

The clutch shaft 21 is rotatably connected via the ball bearing or roller bearing 10a to the housing 41 of the viscous clutch. Furthermore, the clutch shaft 21 is rigidly connected to a primary disc 42, also referred to as the rotor. In its radially outer region on both sides, the rotor 42 has a labyrinth-like formation which engages, closely but without contact, a corresponding similar labyrinth-like formation on the one hand in the clutch cover 45 and in the housing 41. By introducing shear fluid, for example viscous silicone oil, into this labyrinth region, the rotation of the rotor 42 is transmitted simultaneously on one side to the clutch cover 45 as well as on the other side to the housing 41, the amount of oil being critical for the efficiency of the transmission of rotation.

A fan for the radiator of a vehicle is mounted, in a manner not shown, on the housing 41 which is caused to rotate.

Corresponding to FIG. 2, FIG. 3 shows the front part 21b of the clutch shaft 21, whose sleeve 22 axially displaceable by the actuator according to the invention is connected to one end of a valve arm 43, this valve arm having, at its other end, an extension (53) with the aid of which, on movement of the valve arm, an oil outlet hole 52 can be opened to a greater or lesser extent in order thereby to influence the amount of oil in the shear region.

The viscous clutch of FIG. 3 furthermore has a stop 51 for driving the primary disc 42 by the clutch shaft 21, a stop sleeve 40 for the front part 21b and hence for the valve lever 43 and a cover for the oil reservoir, the functions of which are self-evident and need not be explained in more detail here.

The invention was explained with reference to two non-limiting embodiments. It is possible to make numerous changes without deviating from the spirit of the present invention.

Thus, for example, the entire arrangement could rotate inside the hollow cylindrical part together with the clutch shaft, and it would be necessary to provide a corresponding rotational contact for the electric current supply of the coil. This would have the advantage that no ball bearings would have to be used inside the clutch shaft.

What is claimed is:

1. Actuator for actuating a valve for controlling the oil throughput of a viscous clutch, this actuator cooperating functionally with a clutch shaft (1; 21) of the viscous clutch, the actuator comprising:

a solenoid coil (7; 24) which is mounted by means of a bearing (13; 29) within a hollow cylindrical region of the clutch shaft and permitting a rotation of the solenoid coil relative to the clutch shaft (1; 21);

means (1a, 3, 4, 5, 8, 9) on the solenoid coil and the clutch shaft for communicating a control activity of the solenoid coil from inside the hollow cylindrical region to the valve located outside the hollow cylindrical region; and a sleeve member for executing a movement by said solenoid coil, said sleeve member being slidably positioned outside said clutch shaft.

2. Actuator according to claim 1, characterized in that regions of the clutch shaft (1; 3) and the moveable sleeve member (4) are part of the magnetic loop of the solenoid coil (7).

3. Actuator according to claim 2, characterized in that the solenoid coil (7; 24) is mounted on a stationary coil axle (8; 25) and that the outer contour of the coil axle (8; 25) carries the inner contour of a ball bearing (13; 29) which rests with its outer contour on the inner surface of the hollow cylindrical clutch shaft (1; 21) in order thus to ensure a relative rotation between coil axle and clutch shaft.

4. Actuator according to claim 2, characterized in that the clutch shaft (1) comprises a hollow cylindrical main shaft (1) of ferromagnetic material, a pot-like shaft front pan (3) of ferromagnetic material and a nonmagnetic intermediate part (2) which is arranged axially between main part and shaft front pan.

5. Actuator according to claim 3, characterized in tat the clutch shaft (1) comprises a hollow cylindrical main shaft (1) of ferromagnetic material, a pot-like shaft front part (3) of ferromagnetic material and a nonmagnetic intermediate part (2) which is arranged axially between main pan and shaft front part.

6. Actuator according to claim 4, characterized in tat said sleeve member (4) is arranged outside the hollow cylindrical main shaft (1) in such a way that it extends over the nonmagnetic part (2), and, in one of its end positions, it has a considerable overlap with one of the two ferromagnetic parts (3) and little or no overlap with the other of the two ferromagnetic parts (1a), whereas, in the other end position, it has substantially equal overlaps with both ferromagnetic pans (3, 1a) of the clutch shaft.

7. Actuator according to claim 4, characterized in that the main shaft (1a), intermediate part (2) and shaft front pan (3) are screwed or welded to one another.

8. Actuator according to claim 5, characterized in that the main shaft (1*a*), intermediate part (2) and shaft front part (3) are screwed or welded to one another.

9. Actuator according to claim 1 characterized in that the movable component is formed by a pot-like shaft front part (21*b*) whose sleeve like region (22) encloses a cylindrical part (21*a*) of the clutch shaft (21).

10. Actuator according to claim 1, characterized in that the sleeve member (4; 21*b*) is pretensioned by means of a spring (31) in one of two end positions.

11. A viscous clutch having an actuator according to claim 1.

* * * * *